Dec. 14, 1948.  E. ATTESLANDER  2,456,361
DEVICE FOR ADJUSTING THE BLADES OF SHIPS' PROPELLERS
Filed July 15, 1944  2 Sheets-Sheet 1
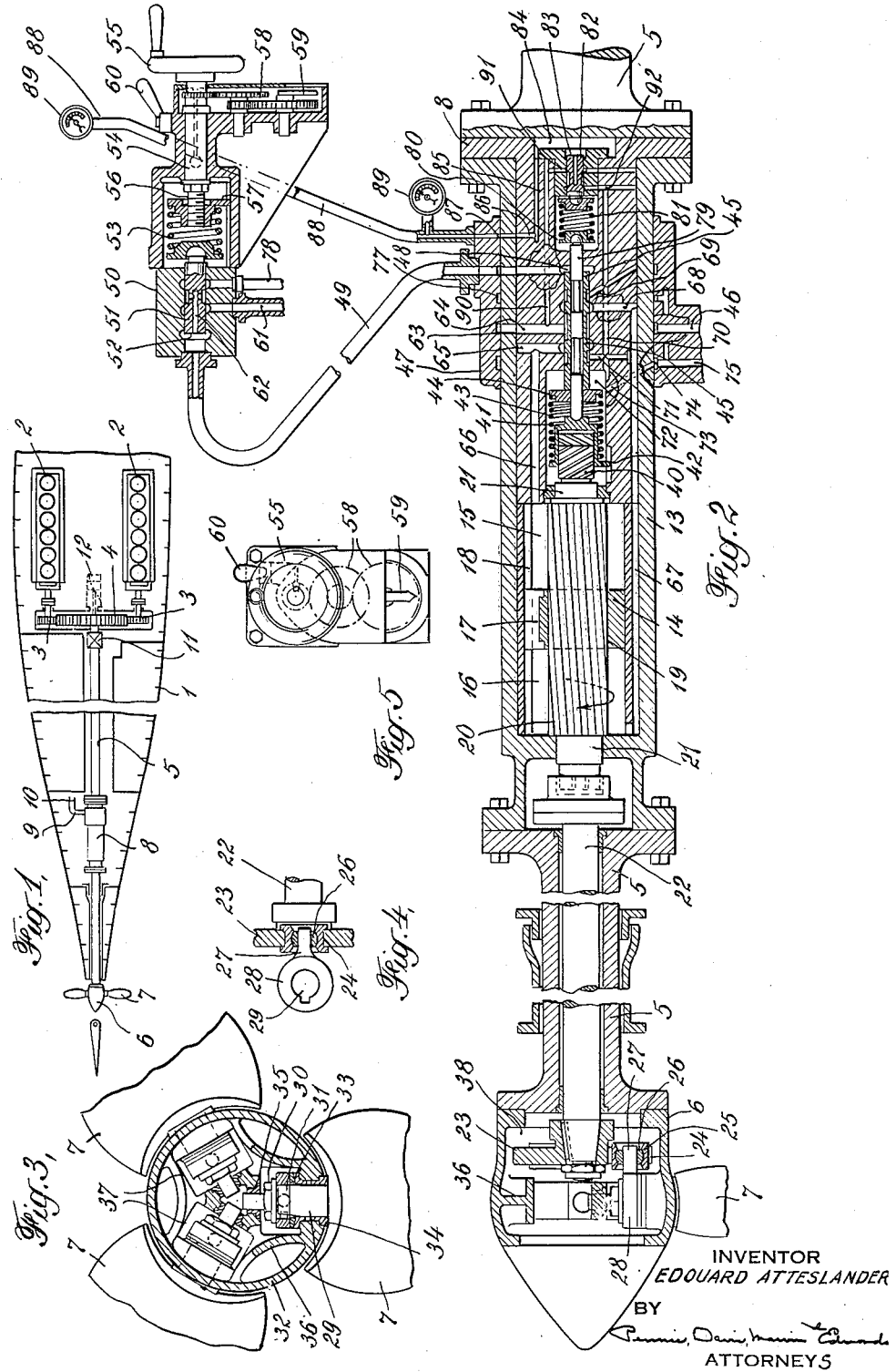
INVENTOR
EDOUARD ATTESLANDER
BY
ATTORNEYS

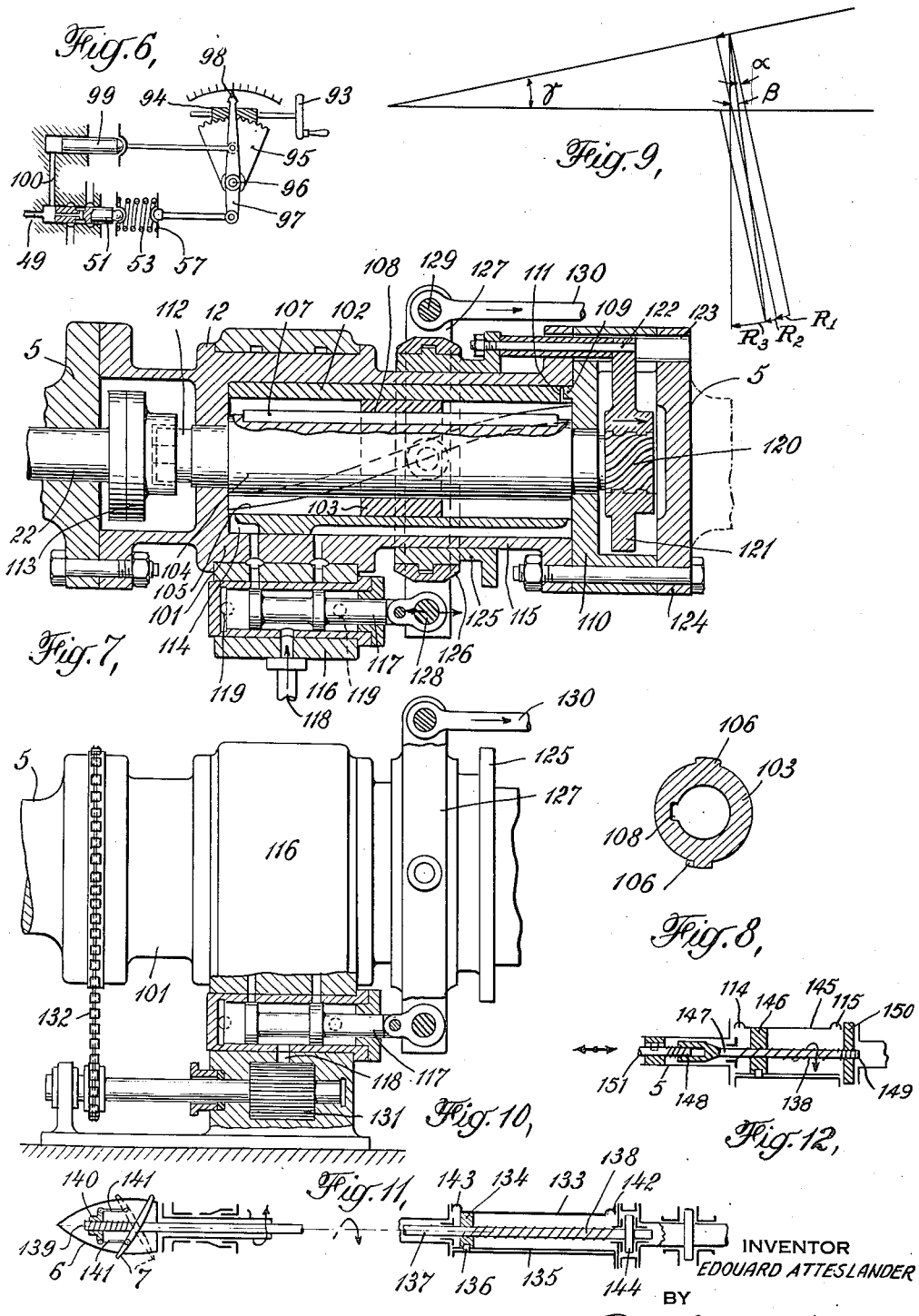

Patented Dec. 14, 1948

2,456,361

UNITED STATES PATENT OFFICE 2,456,361

DEVICE FOR ADJUSTING THE BLADES OF SHIPS' PROPELLERS

Edouard Atteslander, Winterthur, Switzerland, assignor to Sulzer Frères, Société Anonyme, Winterthur, Switzerland Application July 15, 1944, Serial No. 545,179
In Switzerland August 14, 1943

3 Claims. (Cl. 170—160.32)

The invention relates to a device for adjusting the blades of a ship's propeller during service, its purpose being to make it possible for the device to be built into the hub or the shaft even though the adjusting forces are great.

In ship's propellers, as opposed to aircraft propellers the device must be built into the hub and the shaft. The diameter of the shaft and above all that of the hub may then not become too great, as this would unfavourably influence the efficiency of the propeller.

The invention provides accordingly a device for adjusting the propeller in which the servomotor is built into the shaft driving a propeller and rotates with that shaft, the servomotor having a piston actuated by a lubricating pressure means and actuating a screw gear at least partially lubricated by that pressure means which converts the linear motion of the servomotor piston into a rotary motion of a control shaft adjusting the propeller blades. The servomotor and the screw gear are to be combined in such a way that the piston runs both on a screw thread and on a longitudinal guiding, the thread and the guiding being respectively on the control shaft and the servomotor cylinder or vice versa. The longitudinal guiding need not necessarily be straight; but it may also be screw shaped and form with the screw thread a differential screw gear.

Several embodiments of the invention are illustrated diagrammatically in the accompanying drawings in which:

Fig. 1 is a horizontal section through the stern portion of a single screw vessel equipped with variable-pitch propeller and pitch control servomotor in the drive shaft;

Fig. 2 is a longitudinal section through selected portions of the servomotor control apparatus, servomotor drive shaft and propeller hub;

Fig. 3 is a transverse section through the propeller hub;

Fig. 4 is a detail view partially in section on an enlarged scale of the propeller blade crank activating linkage;

Fig. 5 is an end view of the servomotor control apparatus;

Fig. 6 is a schematic illustration of an alternative control apparatus;

Fig. 7 is a longitudinal section illustrating an alternative embodiment of the servomotor proper;

Fig. 8 is a transverse section through the piston of the servomotor illustrated in Fig. 7;

Fig. 9 is a diagram of the forces of friction in gear and linkage;

Fig. 10 is an exterior view of the servomotor illustrated in Fig. 7 showing a method of pressure fluid supply therefor;

Fig. 11 illustrates diagrammatically a further alternative embodiment of the servomotor and screw gear; and Fig. 12 illustrates diagrammatically a final alternative embodiment of the servomotor and screw gear.

In Fig. 1 a marine propulsion plant is shown. The ship 1 is propelled by the engines 2 through the gear 3, 4, which drives the propeller 6 with its adjustable blades 7 through the propeller shaft 5. The adjustment of the blades 7 is effected by means of the servomotor 8, which may be connected to the bridge of the ship, for example through pipes 9 and 10, in a variety of ways not further represented in this figure. A thrust bearing 11 is provided abaft the gear 3, 4. Instead of the servomotor 8 being constructed contained in the propeller shaft 5, it may also be arranged in the position designated 12 forward of the gear 3, 4, the purpose being to simplify the dismantling of the servomotor.

In Fig. 2 one form of complete installation of the servomotor 8 is shown partially in section with portions not requiring illustration omitted. The casing 13 of the servomotor 8 forms an intermediate part of the shafting 5 between the engine and the propeller. The servomotor piston 14 is axially displaced in the cylinder spaces 15, 16 by the pressure medium and is guided in a straight line by a feather 17 running in the groove 18. The piston 14 is further provided in its bore 19 with a thread which engages with the thread of the adjusting shaft 20 in such way that, when the piston 14 is displaced from right to left, the shaft 20 turns in the direction of the arrow.

It will be understood that the straight screw 18 can be regarded as a thread of infinite pitch and could be replaced by a screw of some finite pitch, for example, the screw illustrated for the thread on shaft 20 provided only that shaft 20 is in turn provided with a thread of smaller pitch so that axial movement of piston 14 produces the same relative rotation between shaft 20 and casing 13.

Both the feather 17, the groove 18 and the thread in the bore 19 and on the shaft 20 are so accurately made and machined that they provide sealing between the pressure medium in the cylinder spaces 15 and 16.

The shaft 20 is supported at the ends of the spaces 15 and 16 in bearings 21 provided with sealing means. It is coupled to the shaft 22 in the bore of the propeller shaft 5. The shaft 22 extends into the hub of the propeller 6 and is provided at its lefthand end with a disk 23 having slots 24 in which the sliding block 25 of each of the blades 7 moves backwards and forwards. The sliding block 25 surrounds a ball 26 in the bore of which is supported the pin 27 which forms the lever arm of the crank member 28 and serves for turning the blades 7. The disk 23 is secured against free turning and attached to the tapered end of the shaft 22 by means of a key and a nut.

The collar portions of the cranks 28 surround pivots 29 of the blades 7 forming the three-bladed propeller 6 (Figs. 3, 4). They are pressed and keyed on the tapered pieces 31 by means of the nuts 30 and at the same time serve to support the pivots 29 and the blades 7 against the hub 32, in order to take the load caused by centrifugal forces. In order to obtain perfect supporting even when the pivot 29 is deflected, a spherical supporting surface 33 is provided on a supporting ring between the eye of the lever 28 and the bearing shell 34. This surface 33, however, might also be present on the eye of the crank 28 itself. The pivots 29 are supported in the bearings 34 and 35 in the transverse wall 36. Provided in this are the openings 37 for the eyes of the cranks 28.

By the advantageous arrangement of the cranks 28, which are directed towards the propeller shaft 5, the whole operating mechanism can be housed in the space 38 (Fig. 2), outside the plane of the blades 7, so that a considerable strengthening of the hub 32 by means of the transverse wall 36 is made possible.

On the right-hand end of the adjusting shaft 20 (Fig. 2) is cut a gentle-pitch thread 40, and this engages with the thread in the sleeve 41, which is secured against turning by the tongue 42. The spring 43 is supported at one end on the sleeve 41 and at the other end on the spring plate 44 and loads the control member 45 with a force varying in accordance with the axial travel of the servomotor piston 14.

The control member 45, which controls the supply of pressure medium from the pipe 46 provided in the collar 47 surrounding the casing 13 of the servomotor 8, is loaded at its right-hand end, that is on the surface 48, by the pressure of the hydraulic or pneumatic transmission system 49, which can be set and changed at will by the man attending the servomotor 8, for instance by the steersman of the ship.

For the setting of the pressure in the system 49, the sender 50 is provided with an admission and discharge member 51 in the form of an actuating member, which is loaded on the one side by the pressure of the system 49 on its surface 52, and on the other side by the counter-pressure of the spring 53, which pressure serves to allow the blades and be set and changed at will. The loading of the spring 53 is done through the spindle 54 by means of the handwheel 55, the thread 56 of the spindle axially displacing the spring plate 57, which is secured against turning. The reduction gear 58 and the indicator 59 are operated by the spindle 54 in such a way that the indicator 59 shows the setting of the propeller blades 7 (Fig. 5). The lever 60 serves for holding the spindle 54 from in its position.

If by the turning of the spindle 54 the spring plate 57 is displaced to the left, the spring 53 is loaded and displaces the actuating member 51 to the left. In this way the pressure medium supplied through the pipe 61 by the pressure medium pump or from some other source passes through the passage 62 into the transmission system 49. In the pipe 61 the available pressure is, for instance, 10 atm. gauge, and the pressure in the system 49 varies for the whole range of adjustment of the propeller blades 7 between 1 and 9 atm. gauge. If the pressure in the system 49 is, for instance, 2 atm. gauge, this pressure is increased by the above-mentioned supply of medium from the pipe 61. The increased pressure in the transmission system 49 again displaces the member 51 to the right into the end position shown, as soon as it is high enough to balance the increased counter-pressure of the spring 53.

As a result of the higher pressure in the system 49, the surface 48 is also subjected to heavier load and the control member 45 is displaced to the left. Pressure medium from the pipe 46 passes through the groove 63 in the collar 47 and through the passages 64, 65 and 66 into the cylinder 15, and moves the servomotor piston 14 to the left. The shaft turns in the direction of the arrow and adjusts the propeller blades 7. At the same time the return device 40 to 44 is set in motion, in that the sleeve 41 moving to the right loads the spring 43. As a result the spring 43 is able to balance the increased pressure on the surface 48. The control member 45 is thus returned to its closed position, so that the pressure medium supply to the cylinder space 15 ceases.

During the displacement of the servomotor piston 14 to the left, the pressure medium from the cylinder 16 has flowed through the passages 67, 68 in the casing 13 into the discharge passages 69, 70 and into the space 72, and it passes from there through the passage 73 and the groove 74 into the discharge pipe 75 in the collar 47. The groove 77 in the collar 47 is connected to the discharge pipe 75 in order to prevent the pressure in the groove 63 altering the pressure in the system 49.

If the spindle 54 is turned in the opposite direction, so that the spring plate 57 moves to the right, the spring 53 is unloaded. The pressure of the system 49 on the surface 52 is then great enough to displace the member 51 to the right. In this way communication is established between the system 49 and the discharge pipe 78 until the pressure in the system 49 diminishes enough to correspond to the lower loading of the spring 53.

This has the following effect on the servomotor 14. As a result of the reduced pressure on the surface 48 of the control member 45, the pressure of the spring 43 becomes great enough to move the control member 45 to the right. The pressure medium from the pipe 46 passes through the passages 64, 68 and 67 into the cylinder space 16; that from the cylinder space 15 passes through the passages 66, 65, 71 into the space 72 and to the discharge pipe 75. The pressure medium forces the servomotor piston 14 to the right, the shaft 20 turns in the direction opposite to the arrow, the pitch of the propeller blades 7 is decreased. At the same time the sleeve 41 moves to the left and unloads the spring 41, whereby the member 45 is moved to the left into its closed position.

For the purpose of indicating the position of the servomotor piston 14 at the point of control, the following device is provided:

The control member 45 has a hollow bore and in this, the pin 79 can move freely and is arranged between the spring plate 41 for the spring 43 and the spring plate 80 of the indicator spring 81. Thus the spring 81 is loaded at the same time as the spring 43 in accordance with the travel of the servomotor piston 14, and the indication control member 82 is loaded correspondingly.

The surface 83 of the member 82 is under the pressure prevailing in the space 84, which is in communication through the passages 85, 86 and the annular groove 87 in the collar 47 with the hydraulic or pneumatic indication transmission system 88, to which one or more indicating devices 89 are connected. The pressure medium from the pipe 46 is supplied by way of the groove 63 and the passages 64, 90 and 91 to the indication sender 82, which is connected to the return flow pipe 70 to 75 through the passage 92. When the indication transmission system 88 is long, it is preferable that it should be designed as a pneumatic system, so that the pipes 90 and 92 are separate from the pipes 46 and 70 and are connected to a source of compressed air.

The method of working consists in that if the servomotor piston 14 is displaced to the left, the pin 79 also moves to the left and relieves the spring 81. The pressure on the surface 83 moves the indication sender 82 to the left, so that pressure medium from the space 84 and thus from the transmission system 88 can flow off until equilibrium is established between this pressure and the spring 81, whereupon the indication sender 82 comes into the closed position shown in the drawing.

If the servomotor piston moves to the right, communication is established by the indication member 82 between the pipe 46 up to the passage 91 and the space 84. A rise in the pressure in the space 84 and in the indication transmission system 88 takes place until the member 82 arrives in its closed position and the higher counterpressure of the spring 81 is balanced. The pressure in the indication transmission system 88 changes, in accordance with the characteristic of the spring 81, in proportion to the travel of the servomotor 14, and the indicating devices 89 may be designed as pressure gauges. It is preferable for their scales to show directly the pitch of the propeller blades 7 in degrees. The indication transmission system 88 has the advantage that it is possible for a pointer to be provided at several places.

The servomotor 8 with the sender, return and indicating devices described above, may of course be used not only for the adjustment of the propeller blades of ships or aircraft, but also for the adjustment of the blades of water turbines, pumps, fans and axial compressors as well as for other purposes where a servomotor is required.

In Fig. 6 the segment 95 is moved by means of the handwheel 93 through the spindle 94. This segment turns about the axis 96 and carries with it the double-armed lever 97 and the pointer 98. The double-armed lever 97 is coupled on one side to the spring plate 57, and on the other side to a piston 99. The piston 99 is in communication through the pipe 100 with the system 49 and has the same pressure surface as the member 51. The purpose of this is to balance the pressure of the spring 53 on the lever 97 so that th adjusting force to be employed on the spindle 94 has only to overcome the friction in the transmission system of the sender.

Instead of the bore 19 of the servomotor piston 14 and the shaft 20 in Fig. 2 being provided with a steep-pitch thread, either the cylinder 101 of the servomotor 12 (Fig. 7) itself or preferably the liner 102 in the cylinder 101 may form with the adjusting piston 103 a screw gear, which transforms the motion of the piston 103 in a direction parallel to the axis of the shaft into a rotary motion of the adjusting shaft 104. For this purpose the liner 102 is provided with one or more helical grooves 105, and these grooves are engaged by the correspondingly shaped projections 106 (Fig. 8) of the adjusting piston 103, which completely fill the grooves 105. When the servomotor piston 103 moves longitudinally, it thus turns at the same time about the axis of the shaft 104, which is provided with a longitudinal feather 107 engaging with the groove 108 of the servomotor piston 103.

As shown in Fig. 9, the angle of inclination $\gamma$ of the screw gear 19, 20 or 102, 103, its threads 19, 20 or 105, 106, can be approximately equal to or smaller than the sum of the angle of friction $\alpha$ of the threads 19, 20 or 105, 106 themselves, and an angle $\beta$, which corresponds to the static friction of the parts moving during adjustment. The angle $\beta$ is thus a measure for the force $R_3$, which is necessary to bring out of their position of rest all the parts from the adjusting piston 14 or 103 on, that is to say the adjusting shaft 20 or 104 the linkage, etc., up to and including the adjustable blades 7 (Fig. 2), it being necessary to overcome not only the bearing friction at full load and the friction in the joints, etc., but also the resistance of the pressure medium to be displaced in the auxiliary motor 3 or 12.

The resultant of the hydraulic forces acting on the adjustable blades produces a torque which would cause the blades to turn if the inclination of the thread of the screw gear were not suitably designed to withstand this. However, as such a torque must overcome considerable frictional forces, in particular in the bearings of the blades 7 themselves, as a result of loading by hydrodynamic and centrifugal forces, it is not necessary for the screw gear 19, 20 or 102, 103 itself to be self-locking. It is only the abovementioned friction $R_3$ from the blades to the adjusting piston 14 or 103 and the frictions $R_1$ and $R_2$ of the screw gear itself which need to give a partly or completely self-locking effect.

The propeller shaft 5 has to transmit a considerable torque. As the casing 101, as an intermediate shafting piece, is submitted to torsion in accordance with the magnitude of the torque of the propeller shaft, a liner 102 is provided which it separate from the casing 101. The liner 102 is only carried round by the tongues 109 on the flange 110, which fit into the gaps 111. This offers the advantage that the torsion of casing 101 cannot make itself felt in the liner 102 and any sticking of the projections 106 in the grooves 105, in which they must slide without any play on account of the sealing of piston 103, is impossible.

The shaft part 104 is connected through the sliding coupling 112 to the adjusting shaft 22, which is supported in the shaft 5 and rotates the disc 23 (Fig. 2) for turning the propeller blades 7. This coupling is so arranged that the part 112 can slide in part 113 in an axial direction, in order to prevent any change of length in the adjusting shaft 22 from exerting an effect upon the bearings and sealing of part 104.

The liner 102 has passages 114 and 115 communicating with passages, which open into the grooves of the collar 116 and are connected to the openings of the slide valve 117. The valve 117 controls the supply of pressure oil from pipe 118 and its discharge through pipe 119 to and from the cylinder spaces to the left and right of piston 103.

The right-hand end of the adjusting shaft 104 is provided with a thread 120 and surrounded by the cross-piece 121 with the corresponding counter-thread. The bolts 122 in the bores 123 of the flanges 110 and 124 connect the cross-piece 121 to the sleeve 125, which turns in the stationary adjusting ring 126. The adjusting ring 126 is provided with two pins which support the levers 127 on both sides of the stationary ring 126, these levers being connected by means of the bolts 128 and 129. The valve 117 is linked to the bolt 128 and the rod 130 is connected to the bolt 129, this rod representing for instance the final member of a linkage from the adjusting lever on the bridge of the ship to the valve 117.

The method of operation is clear from the drawing. The rod 130 first displaces the valve 117 by the turning of the lever 127, so that the pressure medium acting upon one or the other side of the piston 103 brings about a displacement of this piston. The cross-piece 121 and the sleeve 125 are meanwhile displaced in the same direction as the piston 103 as a result of the turning of the shaft 104, and the member 117 is returned to the middle position.

For a ship's propeller which must be adjusted both for motion ahead and astern, the position of the piston 103 shown in the drawing corresponds to the neutral position of the blades 7 between ahead and astern motion. In the end positions of the piston 103 the maximum blade adjustment for the one or the other direction of motion is reached. In the case of propellers whose blades are only to be turned between positions of minimum and maximum adjustment, as for example in aircraft, the end positions of the piston 103 would correspond to the extreme adjustments.

If the servomotor 12 were employed within the shafting, the flange 124 would be provided on the shaft piece on the side of the propelling engine; this is shown in the drawing by the chain-dotted line.

Arranged below the control valve 117 in Fig. 10 is the gearwheel pump 131 which is driven direct from the shafting 5 by means of a chain 132. The pump supplies the pressure medium for adjusting the piston 103.

The use of an auxiliary motor built into the propeller shaft with the screw gear as shown in Fig. 2 or in Figs. 7, 8, and 10 offers a very good transmission of force. In this way the advantage is obtained that the cylinder of the servomotor may have a much smaller diameter than in the arrangements hitherto known. As a result the servomotor may also be built into the propeller shaft at a much smaller distance from the stern tube, so that not only the length of the hollow-bored propeller shaft but also that of the adjusting shaft can be kept small.

In Fig. 11 the piston 134, like the piston 14, Fig. 2, is axially guided in the casing 133 by the groove 135 and the longitudinal key 136. The adjusting shaft 137 is connected to the piston 134 through the screw gear 138. The screw gear is designed as a steep-pitch thread, whose pitch, however, is such that, when the piston 134 is moved from one end position to the other, the shaft 137 performs several revolutions, in contrast to the designs shown in Figs. 2 and 3.

For this reason the shaft 137 is provided at its end situated in the hub 6 with a further screw gear 139, which is designed as a gentle-pitch thread. The cross-piece 140 has a corresponding internal thread, so that the rotation of the shaft 137 is converted into an axial motion of the linkage 140, 141 for adjusting the blades 7. This offers the advantage that the manufacture of the servomotor 133, 138 is simpler than that of the servomotor 13, 20 in Fig. 2, because the manufacture of the steep-pitch thread 138 does not require any special devices but only an ordinary lathe, and above all because the diameter of the cylinder 133 may be smaller than that of the cylinder 13.

The arrangement of the screw gear 139 in the hub 6 has the advantage that only the linkage 140, 141 is axially displaced in the hub 138 and no displacement of the shaft 137 takes place. As a result, when the shaft 137 turns, the volume of the hub space does not change, and even at low temperature and with viscous oil neither excessive nor insufficient pressures can present themselves in the hub.

The adjustment of the servomotor piston 134 takes place, as in Figs. 2 and 7, by pressure medium which is controlled by the necessary control member and is supplied or led off, according to the direction of adjustment of the piston 134, through the passages 142 and 143. The supporting bearing 144 serves to take the axial thrust transmitted to the shaft 137 through the linkage 140, 141 by the hydraulic forces acting on blades 7, this thrust being partly balanced by the loading of the piston 134 by the pressure medium.

The servomotor 145 in Fig. 12 also has a gear 138, as in Fig. 11, between the piston 146 and the adjusting shaft 147. On the other hand the screw gear 139 and the supporting bearing 144 in Fig. 11 are replaced by the screw gears 148 and 149, which are likewise designed as gentle-pitch single or multiple thread gears and are preferably self-locking. When the shaft 147 turns, the gear 149 held firm by the end wall 150 produces at the same time an axial displacement of the shaft 147, so that the gear 148 is also displaced. Moreover, the gear 148 produces a further displacement of the adjusting rod 151, which is supported in the propeller shaft 5 and secured against turning. The axial motion of the rod 151 is then the sum of both displacements. This has the advantage that the length of the thread in each section 148, 149 of the screw gear can be kept small and a special supporting bearing can be dispensed with. At the same time the length of the casing and thus the length of the intermediate shafting piece can be kept smaller than the length of the casing 13 in Fig. 2.

I claim:

1. In the propelling plant of a vessel having a variable pitch propeller, a propeller driving shaft, a propeller hub carried by said shaft, adjustable propeller blades pivotally mounted on said hub, a blade adjustment actuating shaft extending axially within and mounted rotatably in relation to said driving shaft, mechanical transmission means operatively connecting said actuating shaft to each of said blades, a hydraulic servomotor cylinder extending axially within and carried by said driving shaft and disposed coaxially about said actuating shaft, a cylindrical piston fitted in said cylinder about said actuating shaft, fluid conduit means leading into said cylinder on both sides of said piston, a source of fluid under pressure connectable through said conduit means to either side of said piston at will, and motion transforming means for transforming linear motion of said piston into rotary motion of said actuating shaft comprising a screw gear having helical guide means within said cylinder engaging the piston to one of said shafts and additional guide means within said cylinder engaging the piston to the other of said shafts, the pitches of said screw gear being selected to make the adjustment of the blades in combination with said mechanical transmission means self-locking and at least the ends of the engaging surfaces of said screw gear being exposed to the fluid under pressure when said fluid actuates said piston on either side thereof.

2. The combination of claim 1 in which the mechanical transmission means comprises a second screw gear operated by the actuating shaft outside the cylinder for converting the rotary motion of said actuating shaft relative to the driving shaft into an axial motion relative to said driving shaft and a system of linkage for utilizing said axial motion to adjust the blades.

3. The combination of claim 1 in which the mechanical transmission means comprises a second screw gear operated by the actuating shaft outside the cylinder for converting the rotary motion of said actuating shaft relative to the driving shaft into an axial motion relative to said driving shaft and a system of linkage for utilizing said axial motion to adjust the blades and the pitches of said second screw gear are selected in combination with the pitches of the first screw gear to make the adjustment of the blades self-locking.

EDOUARD ATTESLANDER.

REFERENCES CITED

The following references are of record in the file of this patent:

UNITED STATES PATENTS

| Number | Name | Date |
| --- | --- | --- |
| 547,459 | Seymour | Oct. 8, 1895 |
| 617,633 | Brinkmann | Jan. 10, 1899 |
| 1,806,083 | Roberts | May 19, 1931 |
| 1,828,965 | Fuller et al. | Oct. 27, 1931 |
| 1,878,358 | Yates | Sept. 20, 1932 |
| 1,925,566 | Ring | Mar. 27, 1934 |
| 1,967,302 | Gannett | July 24, 1934 |
| 2,028,463 | McDougall | Jan. 21, 1936 |
| 2,210,009 | Ruths et al. | Aug. 6, 1940 |
| 2,279,301 | Colley et al. | Apr. 14, 1942 |
| 2,280,714 | Martin | Apr. 21, 1942 |
| 2,355,039 | Eves | Aug. 1, 1944 |

FOREIGN PATENTS

| Number | Country | Date |
| --- | --- | --- |
| 27,972 | Denmark | July 13, 1920 |
| 789,794 | France | Nov. 6, 1935 |
| 217,669 | Switzerland | Apr. 16, 1942 |

OTHER REFERENCES

"Two Swiss Propeller Developments," The Marine Engineer, February 1942, pages 30 and 31.

"Controllable Pitch Propeller," Journal of American Society of Naval Engineers, vol. 52, 1940, page 417.